United States Patent
Shirakawa et al.

(10) Patent No.: US 7,655,912 B2
(45) Date of Patent: Feb. 2, 2010

(54) DIRECTION FINDING RADIATION DETECTOR, AND RADIATION MONITORING METHOD AND APPARATUS

(75) Inventors: Yoshiyuki Shirakawa, Chiba (JP); Toshiya Yamano, Mitaka (JP)

(73) Assignees: National Institute of Radiological Sciences, Chiba (JP); Aloka Co., Ltd., Tokyo (JP)

( * ) Notice: Subject to any disclaimer, the term of this patent is extended or adjusted under 35 U.S.C. 154(b) by 214 days.

(21) Appl. No.: 10/584,838

(22) PCT Filed: Jan. 10, 2006

(86) PCT No.: PCT/JP2006/300148

§ 371 (c)(1),
(2), (4) Date: Jun. 27, 2006

(87) PCT Pub. No.: WO2006/077752

PCT Pub. Date: Jul. 27, 2006

(65) Prior Publication Data

US 2007/0221854 A1  Sep. 27, 2007

(30) Foreign Application Priority Data

Jan. 21, 2005  (JP) ............................ 2005-014578

(51) Int. Cl.
G01T 1/20 (2006.01)
G01T 1/202 (2006.01)
(52) U.S. Cl. ............... 250/361 R; 250/367; 250/370.11
(58) Field of Classification Search ............. 250/361 R, 250/367, 370.1, 370.11
See application file for complete search history.

(56) References Cited

U.S. PATENT DOCUMENTS 3,581,090 A * 5/1971 Brown ................... 250/363.01
5,118,948 A * 6/1992 Ito et al. .................... 250/369
5,519,227 A * 5/1996 Karellas .................. 250/483.1

(Continued)

FOREIGN PATENT DOCUMENTS

| JP | A 4-132987 | 5/1992 |
|---|---|---|
| JP | A 5-066275 | 3/1993 |
| JP | A 2002-221577 | 8/2002 |
| JP | A 2004-361290 | 12/2004 |

OTHER PUBLICATIONS

Shirakawa; "Zen Hokosei γ-sen Kenshutsuki no Kaihatsu" Hoshasen Kagaku, 2004, vol. 47, No. 9 pp. 292-295.
National Institute of Radiological Sciences News, Sep. 2004, No. 94, pp. 1-2.

Primary Examiner—David P Porta
Assistant Examiner—Yara B Green
(74) Attorney, Agent, or Firm—Oliff & Berridge, PLC (57) ABSTRACT

A direction finding radiation detector for detecting the direction of incidence of radioactive rays, comprising: a plurality of scintillators (41, 42, 43) (101, 102, 103) made of the same material, being arranged to overlap circumferentially at least in part so that they are shadowed by each other from radioactive rays incident in circumferential directions and so that light emitted from one of the scintillators is not incident on the other scintillators; and photoreceptor devices (51, 52, 53) (111, 112, 113) having light receiving surfaces optically coupled to the respective scintillators, wherein a combination of proportions of radioactive rays incident directly on the respective scintillators and radioactive rays incident indirectly thereon, being shadowed by the other scintillators, varies with the direction of incidence circumferentially. This achieves weight saving of the detector, improves the detection efficiency of the radioactive rays, elaborates detection information through measurements in half the circumferential directions or all the circumferential directions, and simplifies setting for improved operability.

6 Claims, 13 Drawing Sheets

U.S. PATENT DOCUMENTS

| | | | |
|---|---|---|---|
| 5,659,177 A * | 8/1997 | Schulte et al. | 250/390.12 |
| 5,862,061 A * | 1/1999 | Yamashita et al. | 250/368 |
| 6,586,702 B2 * | 7/2003 | Wiener-Avnear et al. | 219/121.6 |
| 7,339,170 B2 * | 3/2008 | Deliwala | 250/351 |
| 2005/0121618 A1 * | 6/2005 | Fowler et al. | 250/394 |
| 2006/0065844 A1 * | 3/2006 | Zelakiewicz et al. | 250/370.09 |

* cited by examiner

(A) Direction of incidence of 60°

(B) Direction of incidence of 300°

DIRECTION FINDING RADIATION DETECTOR, AND RADIATION MONITORING METHOD AND APPARATUS

TECHNICAL FIELD

The present invention relates to a direction finding radiation detector and a radiation monitoring method and apparatus for detecting the direction of incidence of radioactive rays such as gamma rays and beta rays which are incident from circumferential directions, in the fields of using radioactive materials and radioactive rays such as the nuclear industry, radiation medicine, industrial radiation instrumentation, and nondestructive inspection. In particular, the invention relates to a direction finding radiation detector having a wide directivity, and a radiation monitoring method and apparatus using the detector, which are suitably used in monitoring posts for detecting a radiation leakage to surroundings around nuclear facilities such as a nuclear power plant.

BACKGROUND ART

Conventional gamma ray detectors to be used as survey meters and monitoring posts have been configured to determine a count rate, i.e., a count per unit time or a dose rate, i.e., a dose per unit time.

Then, in order to measure such important information as the incoming direction of radioactive rays, a method has been adopted in which a gamma ray detector is equipped with a large heavy collimator made of lead that it has sensitivity only to gamma rays of one direction passed through the lead collimator. This method, however, has had the problem that the heavy load of the lead collimator makes the detector greater in size and impairs portability thereof. Moreover, there has been another problem that since gamma rays are incident on the detector only in some directions, it is impossible to determine the count rate and dose rate of the radioactive rays (incident from all directions) in that site.

Figure 1:
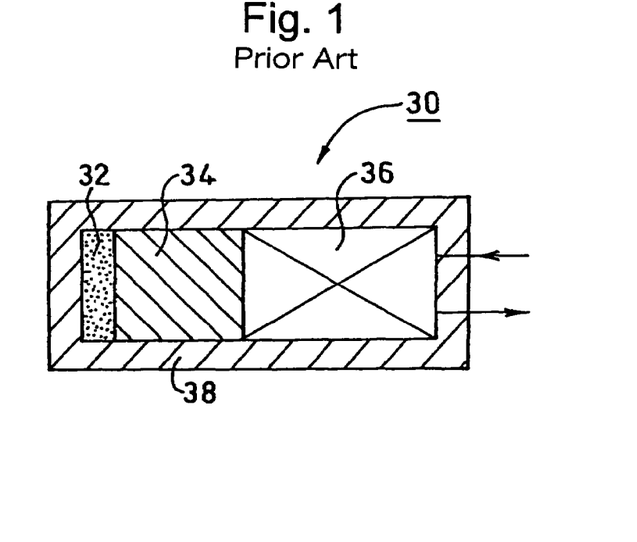
FIG. 1 is a sectional view showing a radiation detector described in Patent Document 1.
Figure 3:
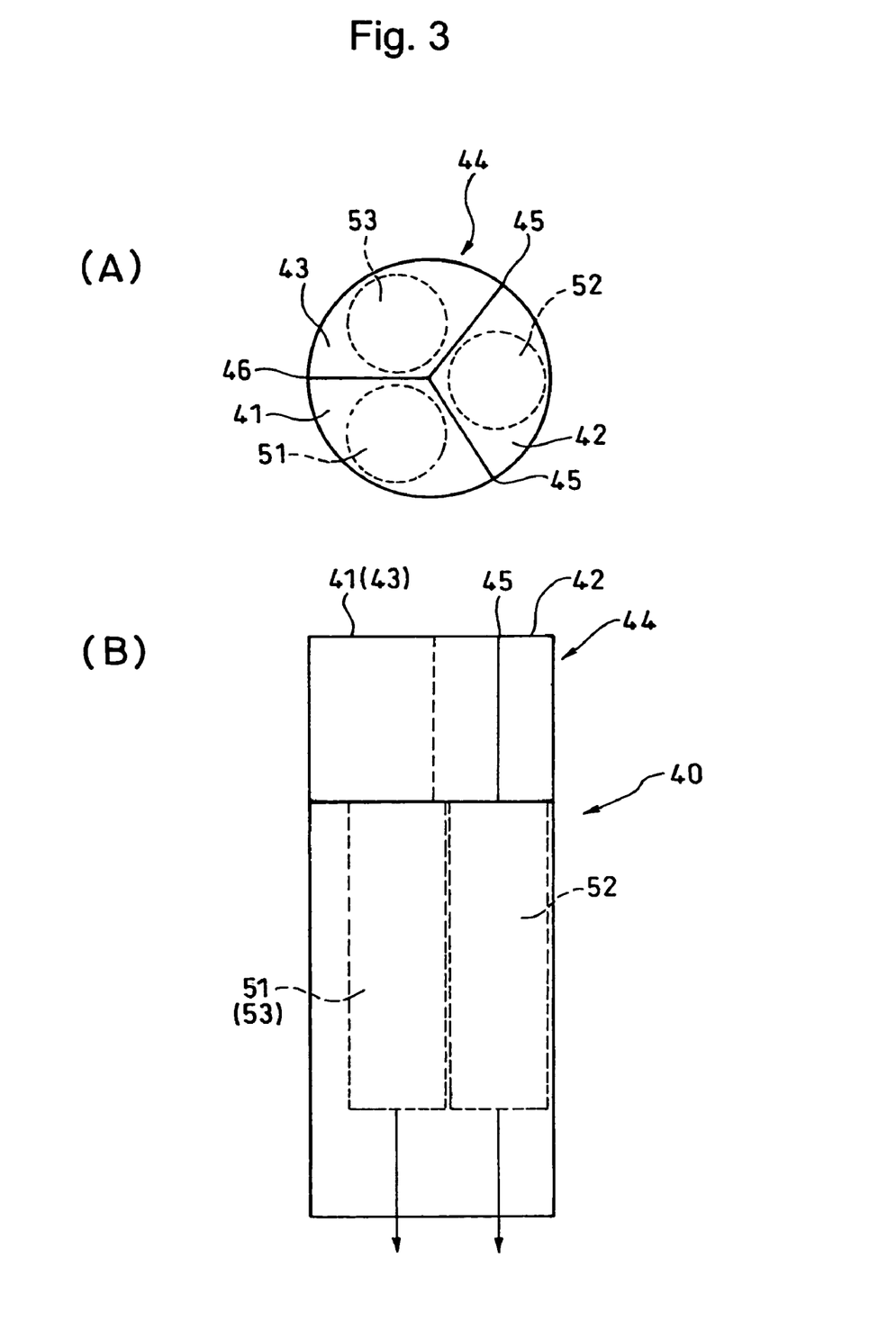
FIGS. 3(A) and 3(B) are a plan view and a sectional view of the same.

In order to solve these problems, as described in Japanese Patent Laid-Open Publication No. Hei 5-66275(Patent Document 1), for example, there has also been developed a radiation detector 30 in which a plate-like thin plastic scintillator 32 of 5 mm or so and a CsI(Tl) scintillator 34 are joined in front and behind as shown in FIG. 1, so that directivity occurs from the relationship between the intensities and the characteristics in shape, such as a rise and a fall, of electric pulses that are generated by the incidence of gamma rays. In FIG. 3, the reference numeral 36 is a photoelectric transducer device, and 38 is a light-shielding case.

Nevertheless, (1) the plastic scintillator 32 has a low density, and the probability for the plastic scintillator 32 to react with, for example, 662-keV gamma rays of Cs137 incident from the front is 5% or so at best, based on calculations using the public code EGS4 of Monte Carlo simulation method. Ninety-five percent enters the subsequent CsI(Tl) scintillator 34 without reaction, which in principle makes calculation impossible. That is, there occurs the problem of low detection efficiency of gamma rays. Moreover, (2) the response sensitivity varies greatly with the angle of incidence. That is, the sensitivity is high in the forward direction to the plastic scintillator 32, whereas the sensitivity drops sharply in lateral directions beyond 20°. The detector is thus unsuitable to monitoring posts or the like which require a wide directivity. Besides, (3) setting the directivity requires an additional operation of recognizing complicated factors such as the intensities and the shapes of electric pulses. Moreover, (4) the detector has no sensitivity backward. Furthermore, there has also been the problem that (5) it is impossible to determine the count rate and dose rate of radioactive rays in that site.

DISCLOSURE OF THE INVENTION

In order to solve the foregoing problems, the inventor has developed a radiation detector such as described in National Institute of Radiological Sciences NEWS, September, No. 94, 2004 (hereinafter, reference document). The present invention has solved the same problems with an apparatus of a method different from the reference document.

As with the reference document, an object of the present invention is to save the weight of the detector, improve the detection efficiency of radioactive rays, elaborate detection information through measurements in half the circumferential directions or all the circumferential directions, and simplify setting for improved operability.

The present invention has solved the foregoing problems by the provision of a direction finding radiation detector for detecting a direction of incidence of radioactive rays, the detector comprising: a plurality of scintillators made of the same material, being arranged to overlap circumferentially at least in part so that they are shadowed by each other from radioactive rays incident in circumferential directions and so that light emitted from one of the scintillators is not incident on the other scintillators; and photoreceptor devices each having a light receiving surface optically coupled to each of the scintillators, wherein a combination of proportions of radioactive rays incident directly on the respective scintillators and radioactive rays incident indirectly, being shadowed by the other scintillators, varies with the direction of incidence circumferentially.

Moreover, the scintillators may be two in number so that the direction of incidence can be detected halfway around in the range of 0° to 180°.

Otherwise, the scintillators may be three or more in number so that the direction of incidence can be detected all around in the range of 0° to 360°.

Moreover, the scintillators may be formed by splitting a single scintillator in the circumferential direction for the sake of uniform characteristics and easy manufacturing.

Moreover, the scintillators may be connected to amplifiers having respective different gains, the amplifiers may be connected to a single A/D converter, and the A/D converter may be connected to a pulse height analyzer corresponding to each of the scintillators, thereby allowing low-cost analysis.

Moreover, the scintillators may be connected to respective amplifiers, the amplifiers may be connected to A/D converters having respective different conversion rates, and the A/D converters are connected to a pulse height analyzer corresponding to each of the scintillators, thereby allowing low-cost analysis likewise.

Otherwise, the scintillators may be connected to respective amplifiers, the amplifiers may be connected to respective A/D converters, and the A/D converters may be connected to respective pulse height analyzers, thereby allowing high precision analysis.

The present invention also provides a radiation monitoring method using the foregoing direction finding radiation detector.

The present invention also provides a radiation monitoring apparatus comprising the foregoing direction finding radiation detector.

According to the present invention, it is possible to obtain a detector that can directly determine the direction of incident numerically in the range of halfway around from 0° to 180° or all around from 0° to 360°, even with a directionally-stable sensitivity. It is also possible to establish an arbitrary directivity by setting ratios, and realize a survey meter with an alarm. Furthermore, the lack of necessity for lead collimators allows weight saving and excellent portability. Moreover, the directions of incidence on a plurality of detectors can be determined to identify the location of the radiation source. Consequently, in view of radiation control, protection, and monitoring, a detection system useful in ordinary times and emergency times can be obtained. In particular, the use of identical scintillators can facilitate dose evaluation.

BEST MODE FOR CARRYING OUT THE INVENTION

Hereinafter, embodiments of the present invention will be described in detail with reference to the drawings.

Figure 2:
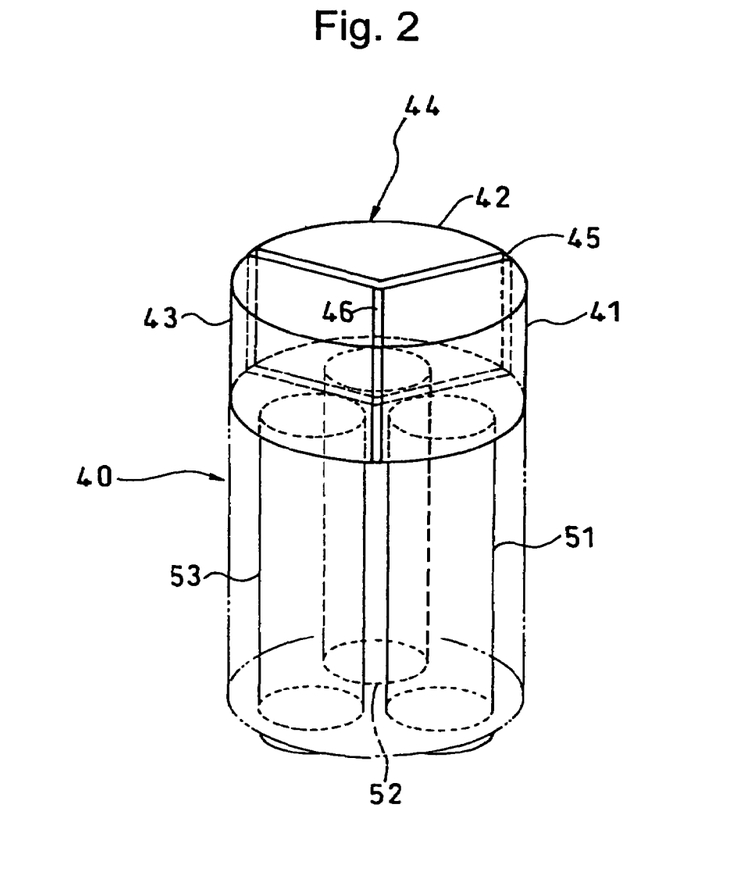
FIG. 2 is perspective view showing the configuration of a first embodiment of the present invention.
Figure 4:
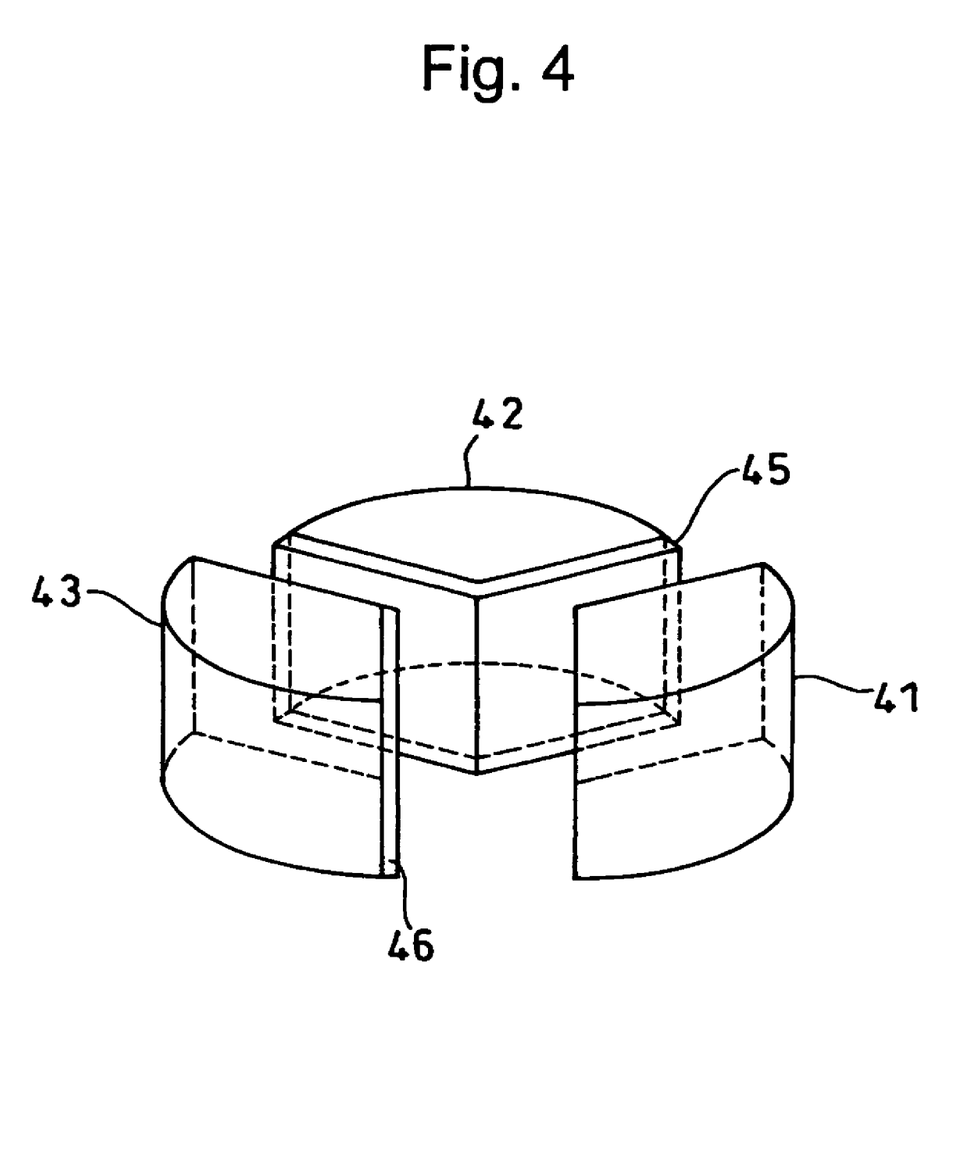
FIG. 4 is an exploded perspective view of a scintillator part of the same.

As shown in FIG. 2 (perspective view), FIG. 3(A) (plan view), FIG. 3(B) (sectional view from the front), and FIG. 4 (exploded perspective view of a composite scintillator), a detection unit 40 of a gamma ray directionality detector according to a first embodiment of the present invention comprises: a composite scintillator 44 which is formed in a cylindrical shape by combining sectoral scintillators 41, 42, and 43 having a high density, high emission efficiency, and a vertex of 120°; and photoreceptor devices 51, 52, and 53 which are arranged in a direction orthogonal to the composite scintillator 44 and have optically-coupled light receiving surfaces.

Reflectors 45 and 46 for preventing light emitted from one scintillator from being incident on the other scintillators are interposed between the boundaries of the individual sectoral scintillators 41, 42, and 43. When the reflectors are used thus, light emitted from one scintillator can be reflected back into the scintillator for high detection efficiency. It should be appreciated that the method of avoiding interference between the scintillators is not limited thereto. For example, absorbers may be used, or the scintillators may be spaced apart to interpose air therebetween for total reflection inside.

The outer periphery of the detection unit 40 is covered with a cylindrical case (not shown) which transmits gamma rays but not light.

Figure 5:
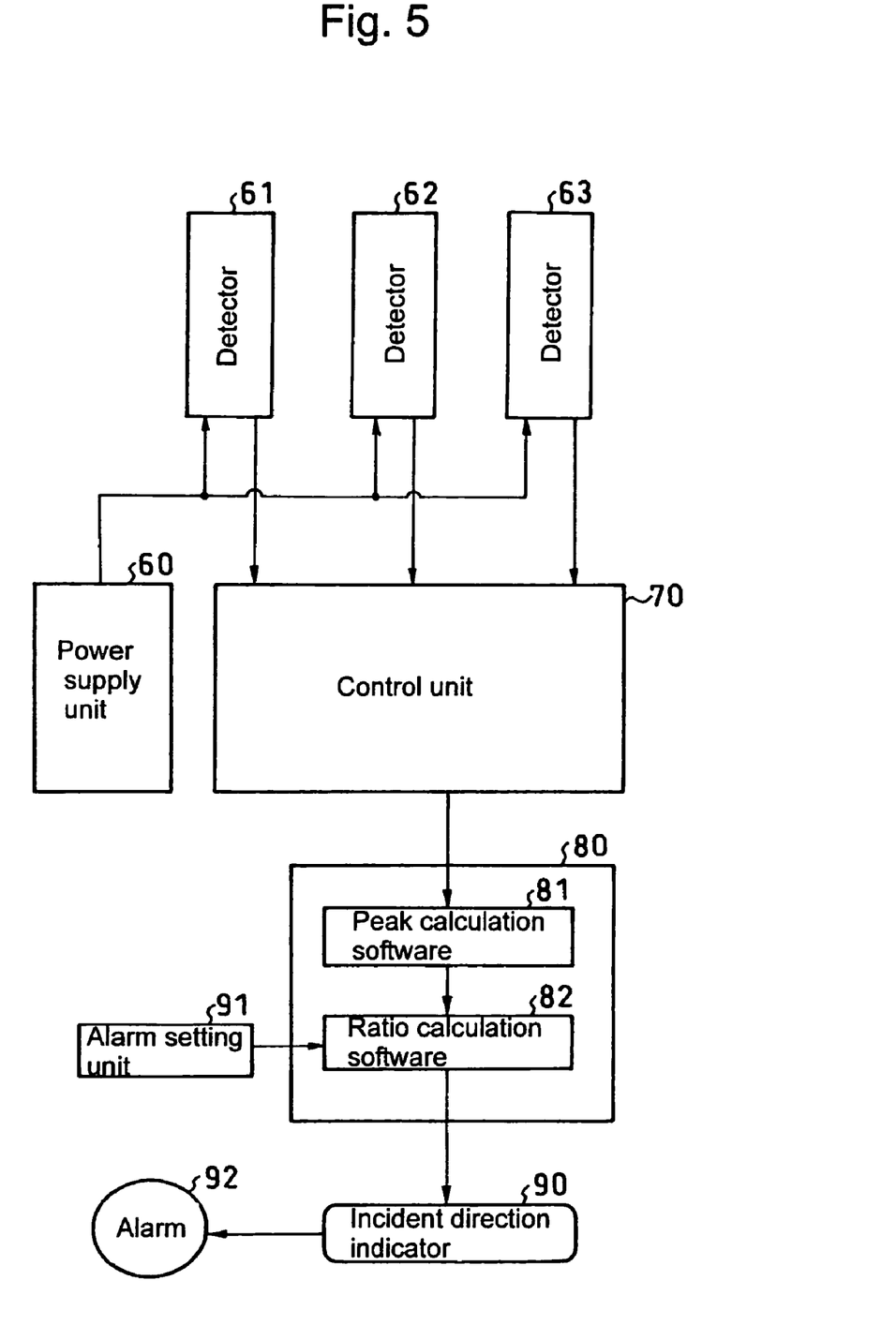
FIG. 5 is a block diagram showing the configuration of a measuring unit of the same.

As shown in detail in FIG. 5, the detection unit 40 contains: a detector 61 which is composed of the scintillator 41 and the photoreceptor device 51; a detector 62 which is composed of the scintillator 42 and the photoreceptor device 52; and a detector 63 which is composed of the scintillator 43 and the photoreceptor device 53. The detection unit 40 is connected with: a power supply unit 60 which supplies electric power to the individual detectors 61, 62, and 63; a control unit 70 which accepts output signals of the respective detectors 61, 62, and 63, amplifies the same, and then conducts A/D conversion to determine a spectrum; a computer (CPU) 80 in which peak calculation software 81 for counting photoelectric peaks of the spectrum and ratio calculation software 82 for determining the ratios R of the counts of photoelectric peaks ascribable to the respective scintillators 41, 42, and 43 and outputting the direction of incidence are installed; an incident direction indicator 90 which indicates the direction of incidence calculated by the CPU 80; an alarm setting unit 91 for setting a range of directions of incidence to issue an alarm on the basis of the ratios R in advance; and an alarm 92 for issuing an alarm when the ratios R fall within the foregoing range.

Figure 6:
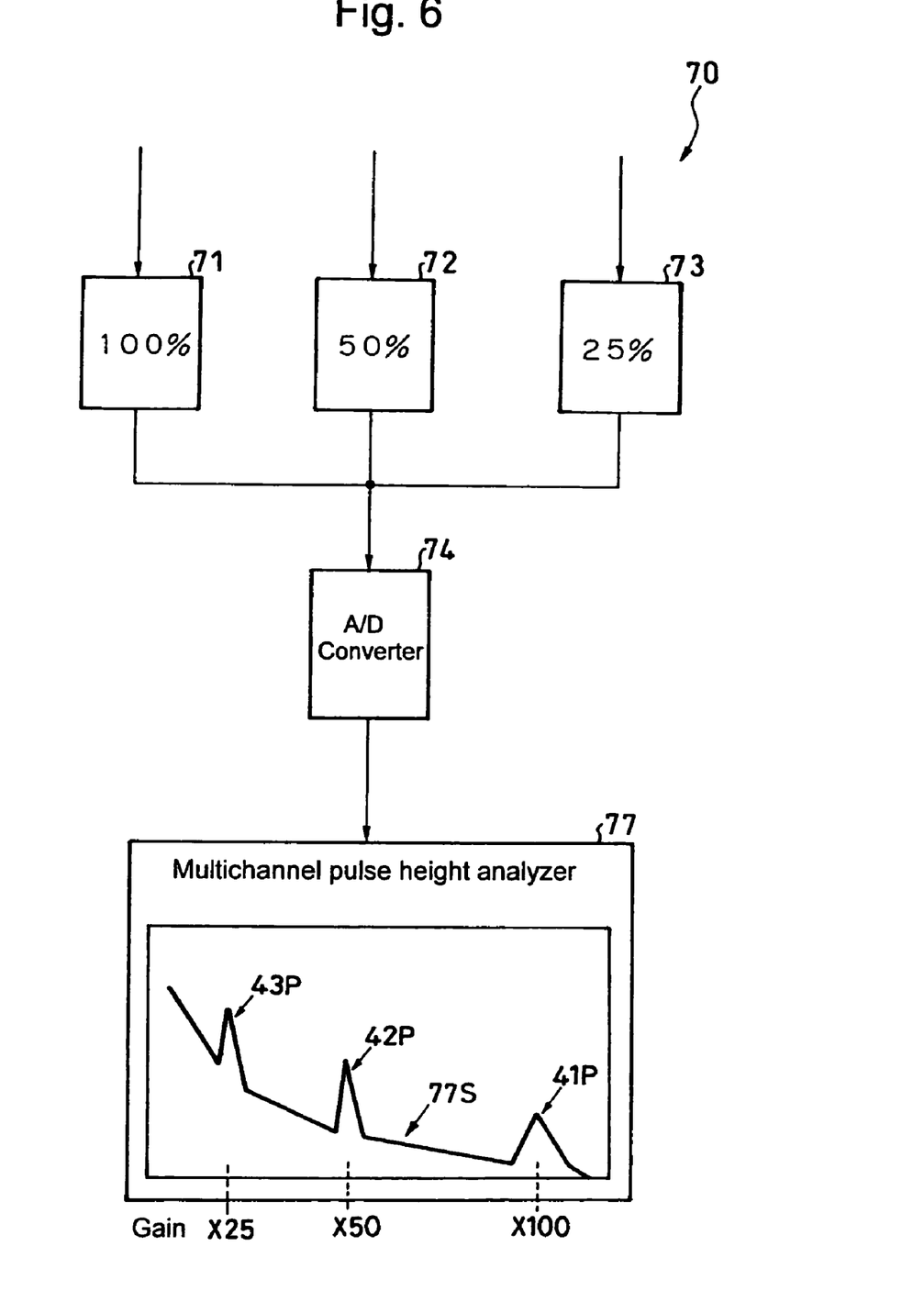
FIG. 6 is a block diagram showing the configuration of a control unit of the same.

For example, as shown in FIG. 6, the control unit 70 comprises: three amplifiers 71, 72, and 73 as many as the scintillators, having respective different gains; a single A/D converter 74; and a multichannel pulse height analyzer 77 having no less than three channels as many as the number of scintillators.

Hereinafter, the operation of the first embodiment will be described.

In the present embodiment, one type of scintillator is split into the three scintillators 41, 42, and 43 having a vertex of 120°, which are mutually connected into the single composite scintillator 44 with the reflectors 45 and 46 applied to the split surfaces. The scintillators 41, 42, and 43 are also optically coupled with the light receiving surfaces of the respective photoreceptor devices 51, 52, and 53 to constitute the detection unit 40.

For example, NaI(Tl) scintillators having high detection efficiency to gamma rays may be used as the high-density sectoral scintillators 41, 42, and 43, thereby constituting a detector having effective directivities all around from 0° to 360°.

Such use of NaI(Tl) scintillators for the scintillators 41, 42, and 43 increases the detection efficiency to gamma rays and the probability of the photoelectric effect as compared to plastic scintillators.

Figure 7:
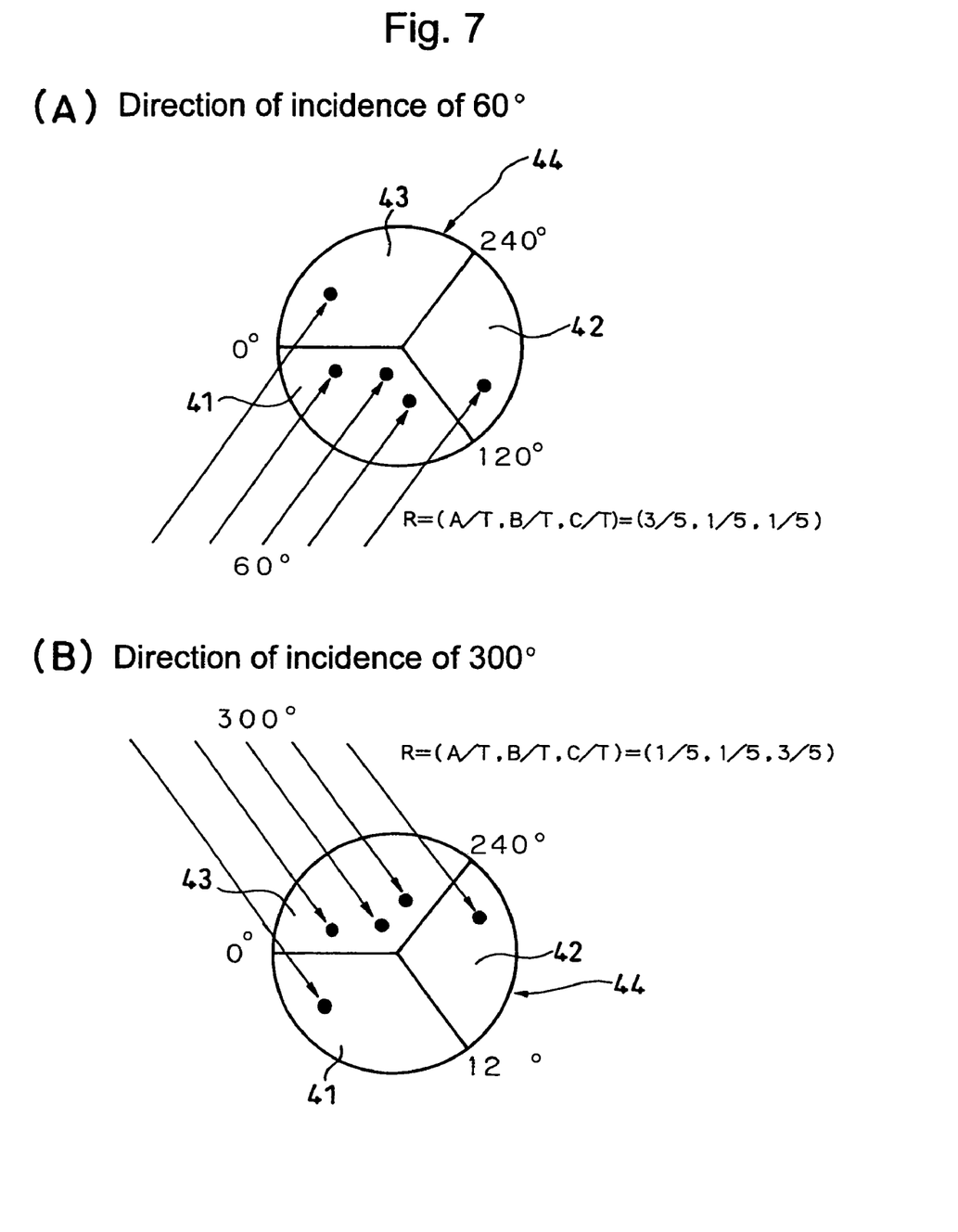
FIG. 7 is a plan view for explaining the principle of measurement of the present invention.

Now, concerning circumferential positions of the composite scintillator 44 in plan view of FIG. 7(A), assume that the leftward direction of the composite scintillator 44 is 0°, the rightward direction counterclockwise 180°, and the single-round direction 360°. As shown in FIG. 7(A), when gamma rays are incident on the composite scintillator 44 in the 60° direction, some of the gamma rays cause the photoelectric effect in the scintillator 41 while others are transmitted through the scintillator 41 without reaction and cause the photoelectric effect in the scintillators 42 and 43. Light pulses occurring from the photoelectric effects of the respective scintillators 41, 42, and 43 are converted into electric charge pulses by the corresponding photoreceptor devices 51, 52, and 53, respectively, and are output to the control unit 70.

Figure 8:
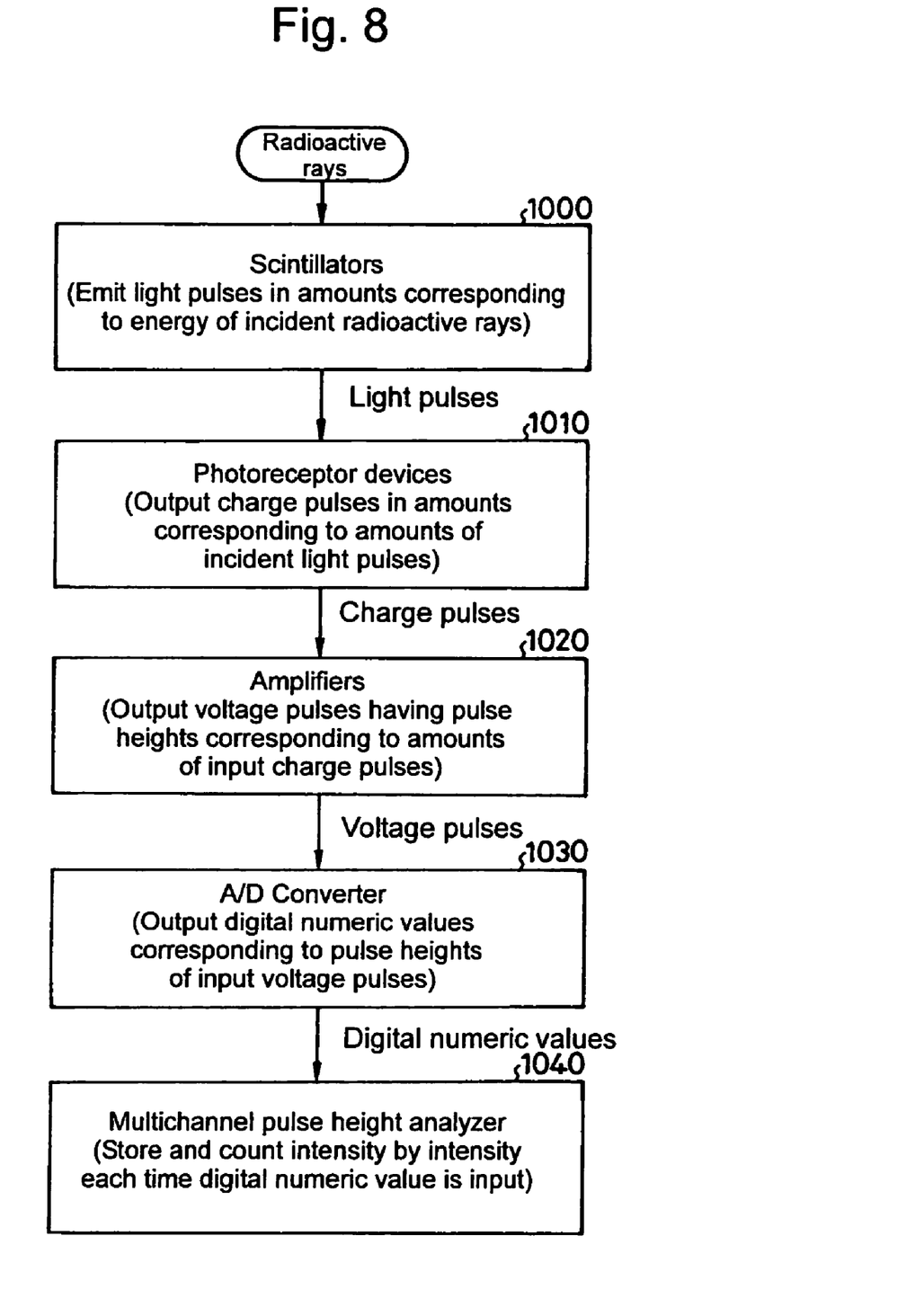
FIG. 8 is a flowchart for showing the operation of the first embodiment.

With reference to the flowchart shown in FIG. 8, description will be given of the overall operating procedure including the amplifiers 71, 72, and 73, the A/D converter 74, and the pulse height analyzer 77 which constitute the control unit 70.

When radioactive rays such as gamma rays and beta rays are incident thereon, the scintillators 41, 42, and 43 emit light to produce light pulses (step 1000). These light pulses are detected and photoelectrically converted by the photoreceptor devices 51, 52, and 53 (step 1010), and the weak analog electric output signals are amplified with predetermined gains by the amplifiers 71, 72, and 73 (step 1020). Moreover, the amplified signals are A/D converted by the A/D converter 74 to obtain digital signals corresponding to the light pulses (step 1030), and the digital signals are analyzed by the multichannel pulse height analyzer 77 to obtain peaks 41P, 42P, and 43P (step 1040).

Here, the photoreceptor devices are not limited to those consisting of a single photomultiplier, but may include a multianode photomultiplier or the like which consists of a large number of photomultipliers, detects light emitted from a large number of scintillators simultaneously, and outputs electric signals indicating the positions of the respective photoreceptor devices.

Since all the scintillators 41, 42, and 43 are made of the same material, they themselves are undistinguishable to the pulse height analyzer 77 in the subsequent stage. Then, in the present embodiment, the amplifiers 71, 72, and 73 in the control unit 70 are given different gains as shown in FIG. 6. This makes it possible for the single multichannel pulse height analyzer 77 to make distinction after the A/D conversion in the A/D converter 74, thereby allowing cost reduction. It should be appreciated that the single multichannel pulse height analyzer may be replaced with single-channel pulse height analyzers as many as corresponding to the scintillators.

More specifically, the electric charge pulses are input to the respective amplifiers 71, 72, and 73, and are input from the amplifier 71 to the A/D converter 74 with a gain of e.g. 100% in ratio, from the amplifier 72 with a gain of e.g. 50%, and from the amplifier 73 with a gain of e.g. 25%. Here, the relationship between the amounts of charge pulses and the pulse height values in the amplifiers (=gains) and the relationship between the pulse height values and digital numbers in the A/D converter (=conversion ratios) both may be set arbitrarily.

Next, after digitization by the A/D converter 74, the pulse height analyzer 77 determines a spectrum 77S. It should be appreciated that the pulse height analyzer 77 shown in FIG. 6 provides a spectrum display resulting from the pulse height analysis for ease of understanding. In fact, the pulse height analyzer 77 need not have the function of spectrum display.

Next, the counts of the respective peaks are determined by the peak calculation software 81 which is already in practical use. For example, the peak 41P resulting from the scintillator 41, the peak 42P resulting from the scintillator 42, and the peak 43P resulting from the scintillator 43 are counted. With the counts as A, B, and C, the ratio calculation software 82 determines the sum total, and calculates the ratios R=(A/T, B/T, C/T). When gamma rays are incident in the direction of incidence of 60° as shown in FIG. 7(A), the gamma rays are incident on the scintillator 41 directly since no other member shadows, i.e., shields the same. The count of the peak 41P becomes the highest, and the counts of the peaks 42P and 43P of the scintillators 42 and 43, shadowed by the scintillator 41, become low. For example, R=(3/5, 1/5, 1/5).

Next, when gamma rays are incident in the direction of incidence of 300° as shown in FIG. 7(B), the gamma rays are incident on the scintillator 43 directly since no other member shadows, i.e., shields the same. The count of the peak 43P becomes the highest, and the counts of the peaks 41P and 42P of the scintillators 41 and 42, shadowed by the scintillator 43, become low. For example, R=(1/5, 1/5, 3/5).

In the range of 0° to 360°, the individual ratios R range from 1/5 to 3/5 in this example.

Figure 9:
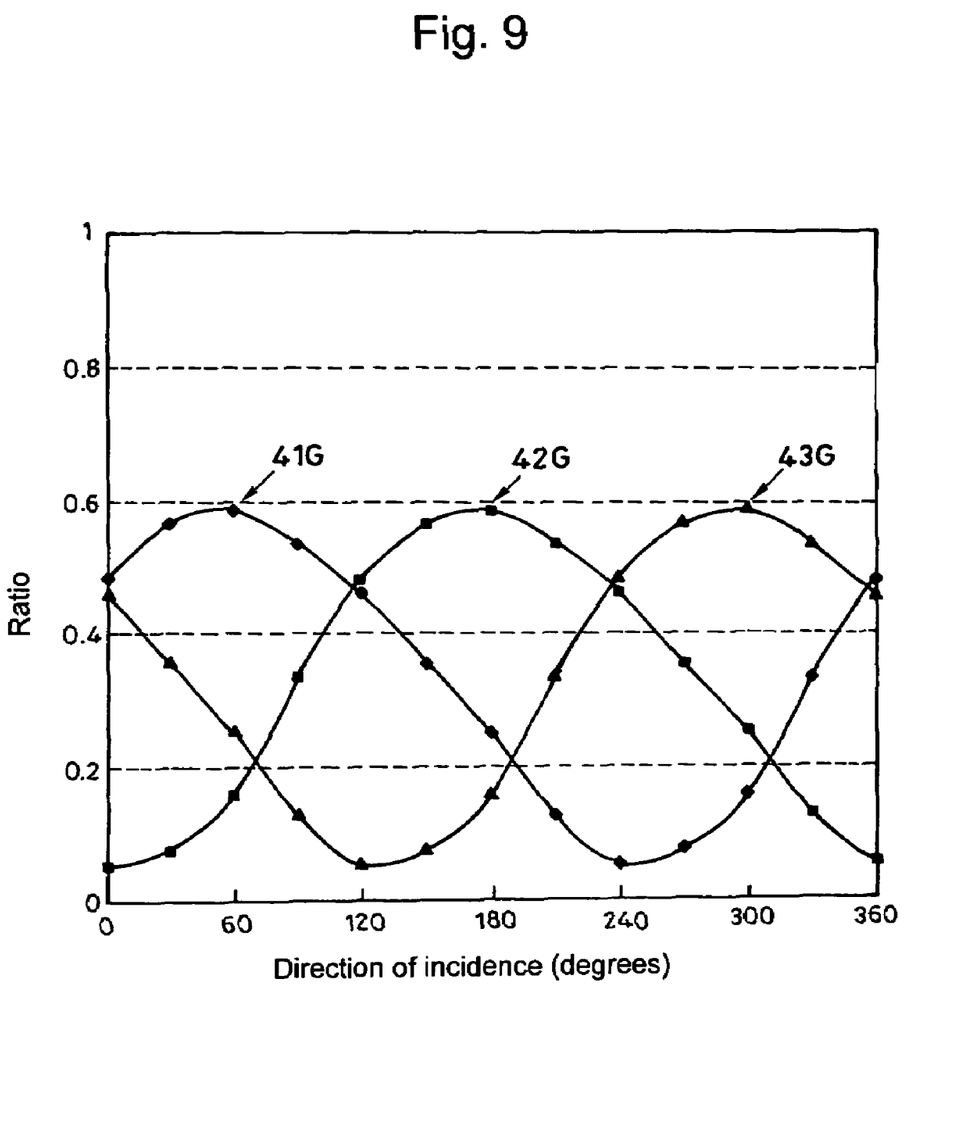
FIG. 9 is a chart showing an example of the relationship between the direction of incidence and ratios of the same.

As above, the proportions between the direct incidence and the indirect incidence vary with the directions of 0° to 360°, and the individual ratios R vary accordingly as shown by graphs 41G, 42G, and 43G in FIG. 9. Conversely, the combination of these ratios R can be determined to find out the direction of incidence of the gamma rays.

Moreover, when the alarm setting unit 91 sets the range of ratios R to issue an alarm, it is possible for the alarm 92 to issue an alarm when gamma rays are incident in those directions.

In the present embodiment, the number of scintillators is three, which allows detection in all the circumferential directions from 0° to 360°. It should be appreciated that the number of scintillators is not limited to three. If detection has only to be made in half the circumferential directions from 0° to 180°, the number of scintillators may be two. The number may be four or more as well.

Figure 10:
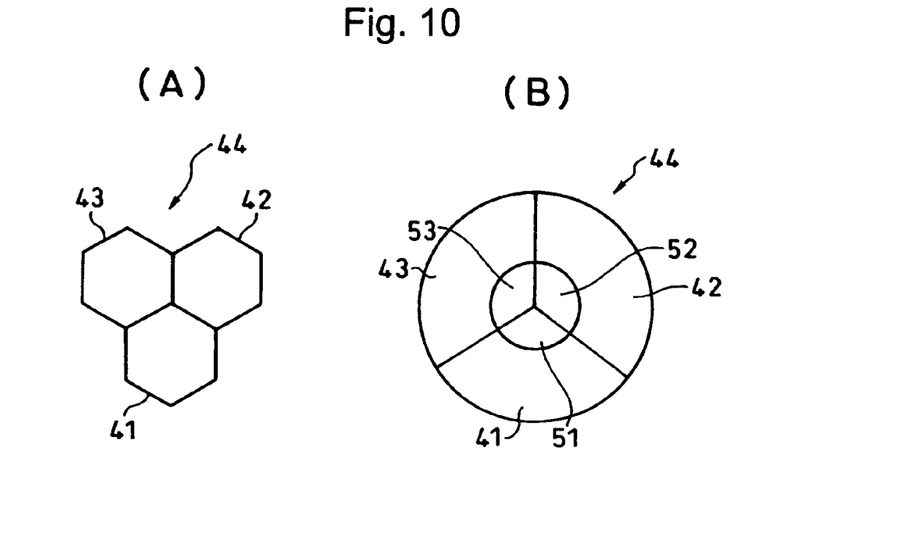
FIG. 10 is a plan view showing a modification of a composite scintillator.

The composite scintillator 44 is not limited to the cylindrical shape, either, but may be shaped like polygonal prisms including a rectangular prism and a hexagonal prism as exemplified in FIG. 10(A), an elliptic cylinder, or a hollow doughnut as exemplified in FIG. 10(B) with the photoreceptor devices 51, 52, and 53 arranged inside.

Figure 11:
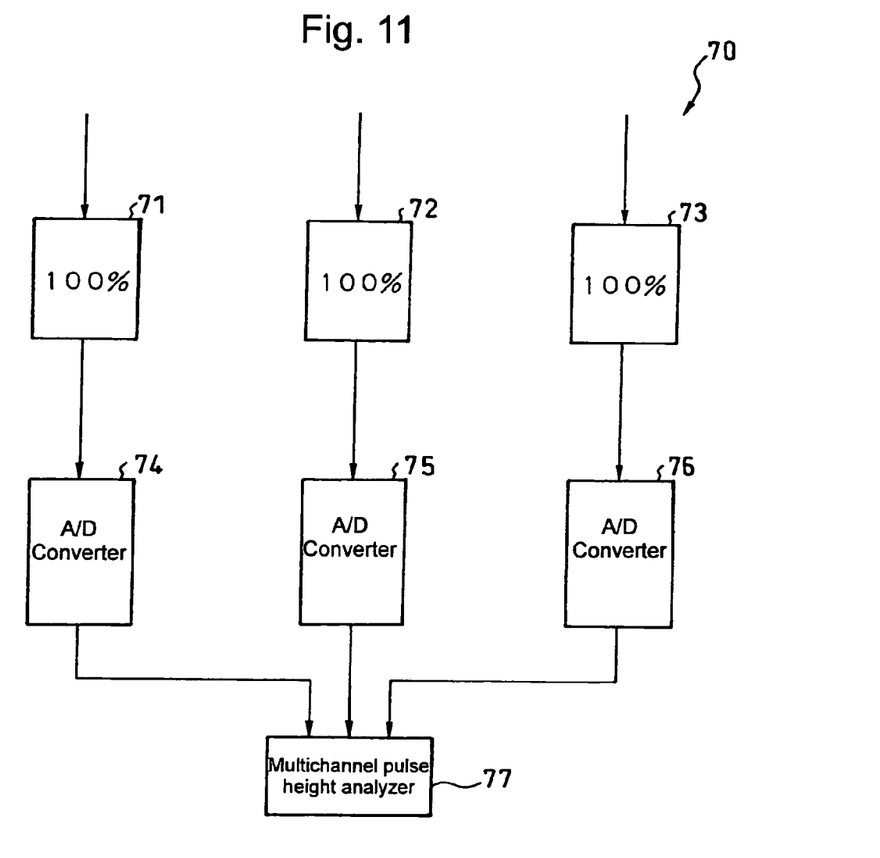
FIG. 11 is a block diagram showing the configuration of the measurement unit according to a second embodiment of the present invention.

Next, description will be given of a gamma ray directionality detector according to a second embodiment of the present invention. In the gamma ray directionality detector according to the first embodiment, the amplifiers 71, 72, and 73 are given different gains. According to the present embodiment, as shown in FIG. 11, the gains are fixed (for example, 100% each) while A/D converters 74, 75, and 76 are given different conversion rates for A/D conversion so that the single multichannel pulse height analyzer 77 can make distinction subsequently, thereby allowing cost reduction.

Figure 12:
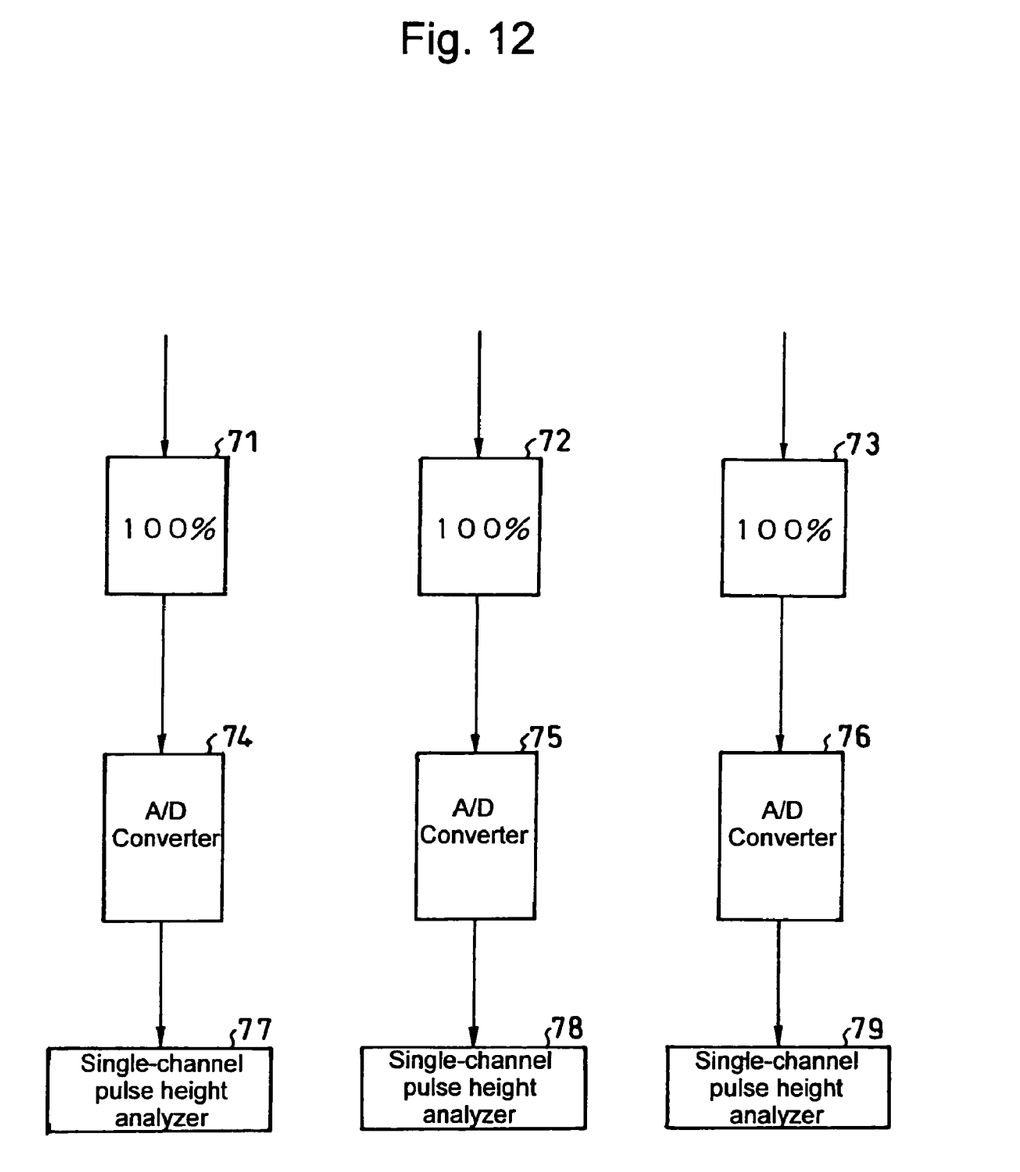
FIG. 12 is a block diagram showing the configuration of the measurement unit according to a third embodiment of the same.

Next, with reference to FIG. 12, description will be given of a third embodiment in which still another method of signal processing is employed. The photoreceptor devices 41, 42, and 43 generate charge pulses, and the charge pulses are input to the respective amplifiers 71, 72, and 73 having the same gain (for example, 100%) and input to respective independent A/D converter 74, 75, and 76 as shown in FIG. 12. Next, spectra are determined by digitized single-channel pulse height analyzers 77, 78, and 79. Next, the ratio calculation software 82, which is already in practical use, determines the sum total T and calculates the ratios R=(A/T, B/T, C/T). Subsequently, the direction of incidence of the gamma rays can be found out as described above, which enables alarm setting.

Figure 13:
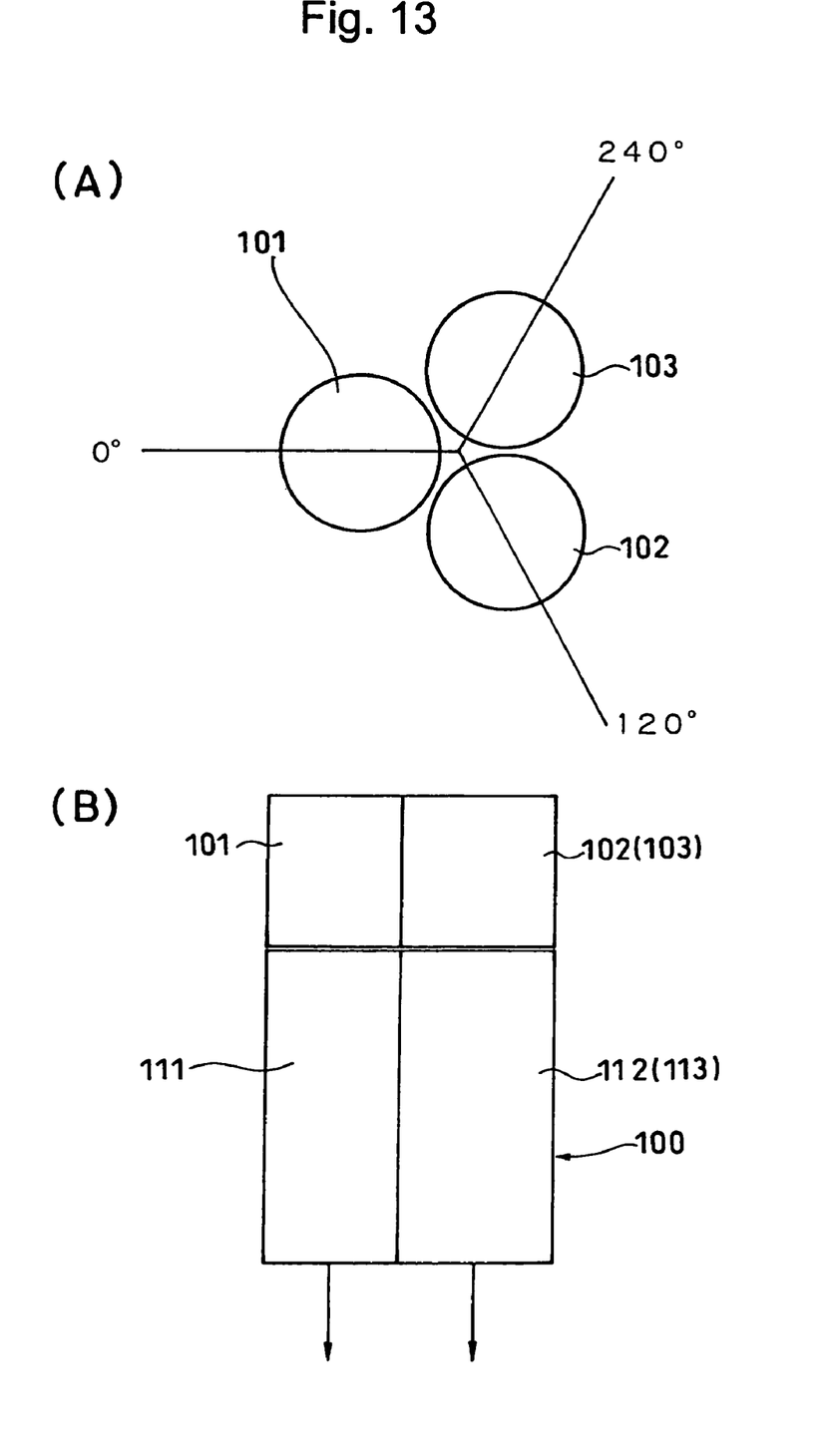
FIGS. 13(A) and 13(B) are a plan view and a sectional view showing the configuration of a fourth embodiment of the present invention.

Next, description will be given of a gamma ray directionality detector according to a fourth embodiment of the present invention. As shown in FIG. 13(A) (plan view) and FIG. 13(B) (sectional view from the front), the detection unit 100 has a circumferential arrangement of: a photoreceptor device 111 which is arranged in a direction orthogonal to a cylindrical scintillator 101 and has a light receiving surface optically coupled thereto; a photoreceptor device 112 which is arranged in a direction orthogonal to a cylindrical scintillator 102 and has a light receiving surface optically coupled thereto; and a photoreceptor device 113 which is arranged in a direction orthogonal to a cylindrical scintillator 103 and has a light receiving surface optically coupled thereto.

Since the operation is the same as that of the first embodiment except in that the curves of FIG. 9 are complicated in shape, detailed description thereof will be omitted.

Practical Example

According to the first embodiment shown in FIGS. 1 and 4, light reflectors 45 and 46 of thin aluminum foils were bonded to NaI(Tl) scintillators 41, 42, and 43 of sectoral prism shape having a diameter of 75 mm, a thickness of 50 mm, and a vertex of 120°. The individual scintillators were combined into a composite scintillator 44, thereby constituting the detection unit 40 with 25-mm-diameter photomultipliers as the photoreceptor devices 51, 52, and 53. The case of the detection unit 40 is made of such materials as aluminum and stainless steel which shield the light emitted from the scintillators from disturbing visible light and ultraviolet rays.

A high voltage of around 800 V was supplied from the power supply unit 60 to the detection units 61, 62, and 63.

Here, Cs137, a typical gamma ray source in use for the calibration of ordinary survey meters or the like and for industrial measurement instruments and nondestructive test systems, was prepared. The radioactive level was as weak as 3.7 MBq.

The radiation source was placed in a position 100 cm from the center of the joint surfaces of the scintillators, rotated from 0° to 360° in the circumferential direction to the cylindrical axis, and counted for 300 seconds in each direction. This condition is, in fact, equivalent to the number of gamma rays incident on the composite scintillator 44 when a radiation source having an ordinary level of 37 GBq is positioned 10 m away and counted for 3 seconds.

Description will be given of the operation when gamma rays are incident at 60°. Many of the gamma rays incoming at a time react with the NaI(Tl) scintillator 41, and light pulses of certain intensity are generated by the photoelectric effect during the reaction. The light pulses are converted into charge pulses proportional to the intensity by the photomultiplier 51, or photoreceptor device, for output. This output is proportionally amplified by the amplifier 71 in the control unit 70. The output from the amplifier 71 creates a peak 41P in the high channel region of the spectrum shown in FIG. 14. Meanwhile, some of the gamma rays are transmitted through the scintillator 41, and cause the above-mentioned photoelectric effect in the scintillators 42 and 43, thereby creating peaks 42P and 43P in the middle and low channel regions of the spectrum. This makes it possible for the general-purpose peak calculation software 81 built in the CPU 80 to recognize the peaks and determine the counts of these peaks. Then, the ratio calculation software 82 built in the CPU 80 calculates the ratios R.

Figure 14:
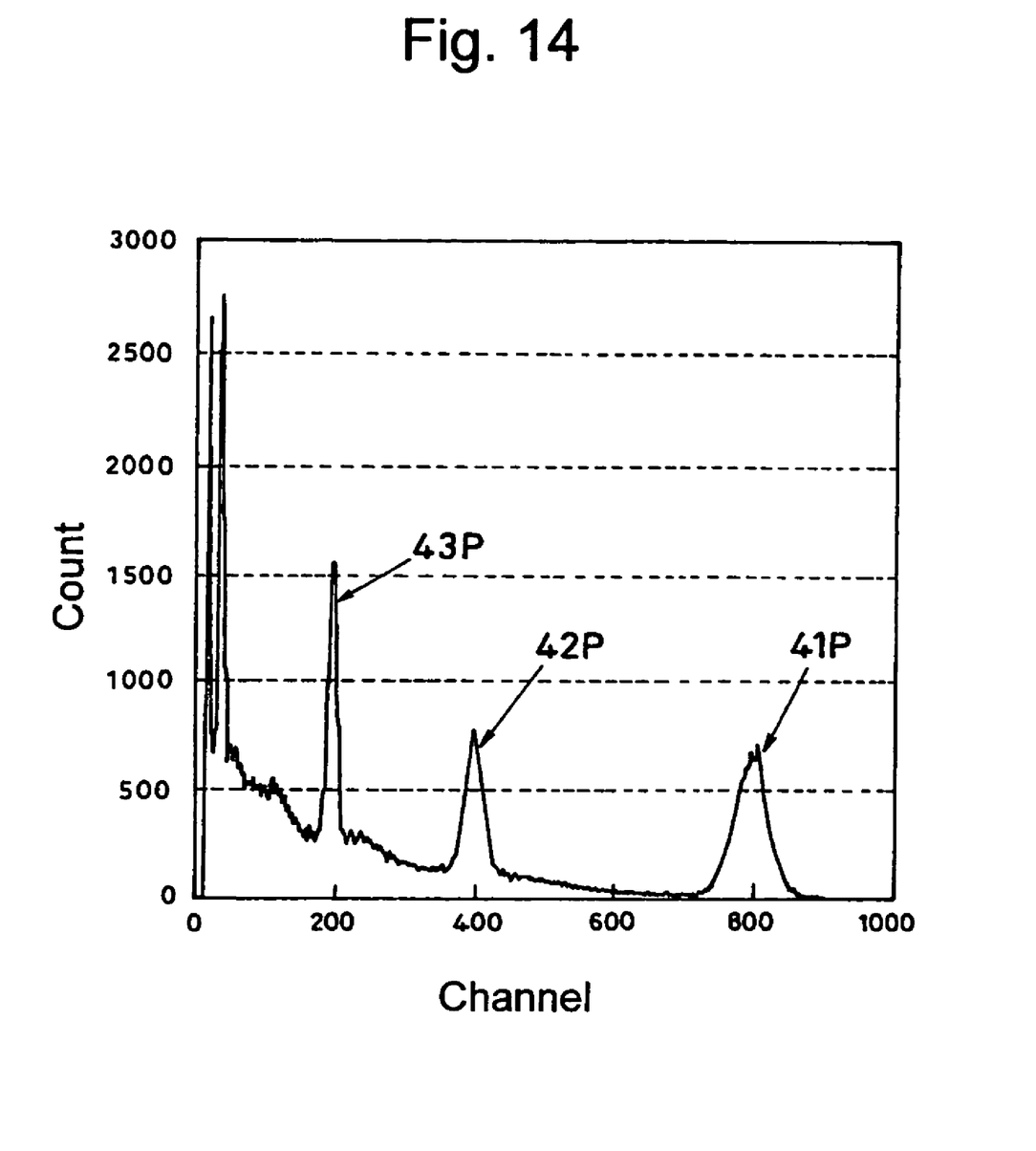
FIG. 14 is a spectrum chart of a practical example of the first embodiment.

Next, take the case where gamma rays are incident at 300°. In this case, the gamma rays are incident on the scintillator 43 directly, thereby creating a large peak 43P and making the count high. On the other hand, the gamma rays are incident on the scintillators 41 and 42 indirectly, thereby making small peaks 41P and 42P. The ratios R can be calculated in the same manner.

As shown in FIG. 9, the relationships between these ratios R and the directions of incidence trace the graphs 41G, 42G, and 43G. Since the ratios R=(A/T, B/T, C/T) can be determined from measurements, it is possible to identify the direction of incidence from the graphs.

Moreover, if the range of ratios R is set by the alarm setting unit 91, the alarm 92 issues an alarm when the ratios R fall within that range.

As above, the detector has the functions of determining the direction of incidence numerically and issuing an alarm.

While NaI(Tl) scintillators are used in this practical example, they may be replaced with CsI(Tl) scintillators, BGO scintillators, or other scintillators.

The composite scintillator 44 desirably has a diameter of 75 mm as in the practical example since it is possible to detect a wide range of energy of 50 to 2000 keV around 137CS of 662 keV. Nevertheless, a large diameter of 100 mm is desirable when detecting high energy (1333 keV) of 60Co or the like, and a small diameter of 50 mm conversely when detecting low energy (60 keV) of 241 Am or the like, since the graphs shown in FIG. 9 can be increased in amplitude.

Moreover, while the optical coupling between the individual scintillators and the light receiving surfaces of the photoreceptor devices is established as direct coupling for the sake of a simple structure, indirect coupling via optical fibers or the like is also available.

Figure 15:
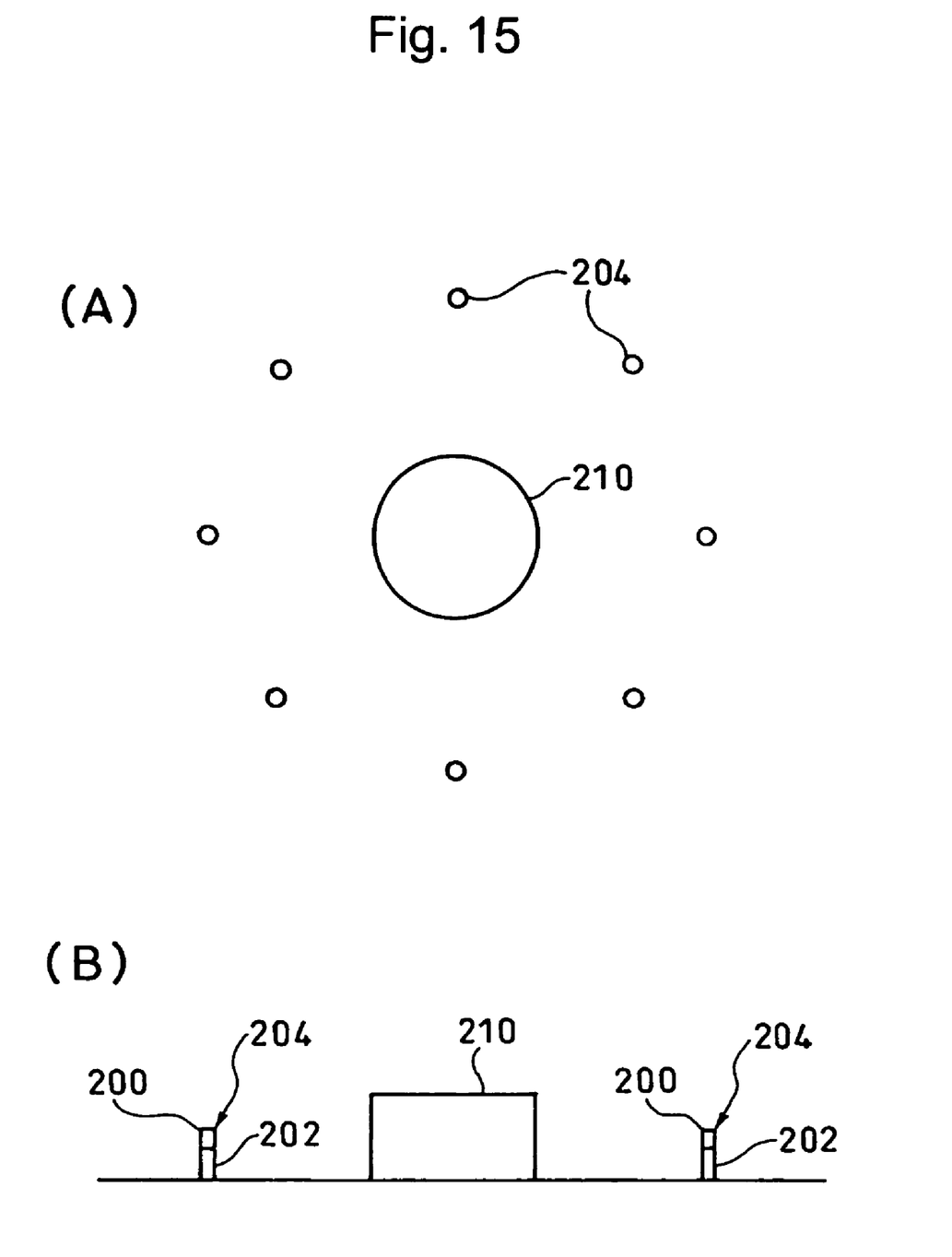
FIGS. 15(A) and 15(B) are a plan view and a sectional view showing the configuration of an example of application of the present invention.

As shown in FIG. 15(A) (plan view) and FIG. 15(B) (front view), the detector 200 of the present invention may be mounted on fixing means 202 such as a tripod and a pole, and used as a wide-directivity gamma ray monitoring post 204 to be installed in numbers around nuclear facilities 210. It may also be used as a wide-directivity gamma ray survey meter.

It should be appreciated that the target to be detected is not limited to gamma rays. Mica and the like may be used to allow applications for beta ray direction detection. In this case, it is possible to detect locations of surface contamination promptly.

INDUSTRIAL APPLICABILITY

The present invention may be used to detect the direction of incidence of radioactive rays such as gamma rays and beta rays incident in circumferential directions, in the fields of using radioactive materials and radioactive rays such as the nuclear industry, radiation medicine, industrial radiation instrumentation, and nondestructive inspection.

The invention claimed is:

1. A direction finding radiation detector for detecting a direction of incidence of radioactive rays, the detector comprising:

three or more scintillators, formed by splitting a single scintillator in a circumferential direction and being arranged to overlap circumferentially, such that: (1) the scintillators are shadowed by each other from radioactive rays incident in circumferential directions, (2) the light emitted from one of the scintillators is not incident on the other scintillators; and (3) the direction of incidence is detected all around in the range of 0° to 360°, photoreceptor devices each having a light receiving surface optically coupled to each of the scintillators, wherein a combination of proportions of radioactive rays incident directly on the respective scintillators and radioactive rays incident indirectly, being shadowed by the other scintillators, varies with the direction of incidence circumferentially, the scintillators are connected to amplifiers having respective different gains to shift peak positions with each other, the amplifiers are connected to a single A/D converter, and the A/D converter is connected to a single pulse height analyzer, and the detector is connected to a computer that calculates a ratio R of counts of photoelectric peaks ascribable to the scintillators by calculating a sum total T and ratios R=(A/T, B/T, C/T), wherein A, B and C are counts of the photoelectric peaks.

2. A radiation monitoring method comprising the steps of setting the direction finding radiation detector according to claim 1; and measuring a circumferential radiation using the direction finding radiation detector.

3. A radiation monitoring apparatus comprising the direction finding radiation detector according to claim 1.

4. A direction finding radiation detector for detecting a direction of incidence of radioactive rays, the detector comprising:

three or more scintillators, formed by splitting a single scintillator in a circumferential direction and being arranged to overlap circumferentially, such that: (1) the scintillators are shadowed by each other from radioactive rays incident in circumferential directions, (2) the light emitted from one of the scintillators is not incident on the other scintillators; and (3) the direction of incidence is detected all around in the range of 0° to 360°, photoreceptor devices each having a light receiving surface optically coupled to each of the scintillators, wherein a combination of proportions of radioactive rays incident directly on the respective scintillators and radioactive rays incident indirectly, being shadowed by the other scintillators, varies with the direction of incidence circumferentially, the scintillators are connected to amplifiers having respective different gains to shift peak positions with each other, the amplifiers are connected to a single A/D converter, and the A/D converter is connected to a single pulse height analyzer, and the detector is connected to a computer that calculates a ratio R of counts of photoelectric peaks ascribable to the scintillators by calculating a sum total T and ratios R=(A/T, B/T, C/T), wherein A, B and C are counts of the photoelectric peaks.

5. A radiation monitoring method comprising the steps of setting the direction finding radiation detector according to claim 4; and measuring a circumferential radiation using the direction finding radiation detector.

6. A radiation monitoring apparatus comprising the direction finding radiation detector according to claim 4.

* * * * *